United States Patent
Lim et al.

(10) Patent No.: US 8,610,851 B2
(45) Date of Patent: Dec. 17, 2013

(54) LIQUID CRYSTAL DISPLAY DEVICES AND METHODS OF MANUFACTURING LIQUID CRYSTAL DISPLAY DEVICES

(75) Inventors: Jae-Ik Lim, Yongin (KR); Jae-Hyun Kim, Yongin (KR); Gee-Bum Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 132 days.

(21) Appl. No.: 13/071,381

(22) Filed: Mar. 24, 2011

(65) Prior Publication Data

US 2012/0105772 A1    May 3, 2012

(30) Foreign Application Priority Data

Nov. 1, 2010 (KR) .............................. 2010-0107638

(51) Int. Cl.
 *G02F 1/1335* (2006.01)
(52) U.S. Cl.
 USPC ........................................................ 349/114
(58) Field of Classification Search
 USPC ........................................................ 349/114
 See application file for complete search history.

(56) References Cited

U.S. PATENT DOCUMENTS

| | | | |
|---|---|---|---|
| 6,124,907 A * | 9/2000 | Jones et al. | 349/96 |
| 6,166,789 A * | 12/2000 | Koenig | 349/86 |
| 2006/0044494 A1 * | 3/2006 | Jeng et al. | 349/114 |
| 2006/0055852 A1 * | 3/2006 | Yoshida et al. | 349/114 |
| 2006/0240587 A1 | 10/2006 | Yang | |
| 2007/0115411 A1 * | 5/2007 | Ozawa et al. | 349/114 |

FOREIGN PATENT DOCUMENTS

| | | |
|---|---|---|
| JP | 11-183881 | 7/1999 |
| KR | 1998-029979 | 7/1998 |
| KR | 10-1999-0029886 A | 4/1999 |
| KR | 10-2003-0077416 A | 10/2003 |
| KR | 10-2006-0111261 | 10/2006 |
| KR | 10-2007-0043473 | 4/2007 |
| KR | 10-2009-0056856 | 6/2009 |

OTHER PUBLICATIONS

KIPO Office action dated May 31, 2012 for KR 10-2010-0107638 (4 pages).
KIPO Office action dated Oct. 28, 2011, for Korean priority Patent application 10-2010-0107638, 4 pages.

* cited by examiner

*Primary Examiner* — Lucy Chien
(74) *Attorney, Agent, or Firm* — Christie, Parker & Hale, LLP

(57) ABSTRACT

A liquid crystal display device includes a first substrate having a reflective region and a transmissive region, a second substrate corresponding to the first substrate, and a liquid crystal structure located between the first substrate and the second substrate, the liquid crystal structure including a first liquid crystal layer located in the reflective region and a second liquid crystal layer located in the transmissive region, wherein the first liquid crystal layer is configured to control movement of the second liquid crystal layer.

15 Claims, 7 Drawing Sheets

LIQUID CRYSTAL DISPLAY DEVICES AND METHODS OF MANUFACTURING LIQUID CRYSTAL DISPLAY DEVICES

CROSS-REFERENCE TO RELATED APPLICATION

This application claims priority under 35 U.S.C. §119 to Korean patent Application No. 2010-0107638, filed on Nov. 1, 2010, the disclosure of which is hereby incorporated by reference herein in its entirety.

BACKGROUND

1. Field

Example embodiments of the present invention relate to liquid crystal display devices and methods of manufacturing liquid crystal display devices.

2. Description of Related Art

A liquid crystal display (LCD) device generally includes two transparent substrates and a liquid crystal layer located between the substrates. The liquid crystal display device displays an image by controlling transmittance of light according to orientation of liquid crystal molecules in the liquid crystal layer by varying an electric field generated between the substrates. The liquid crystal molecules in the liquid crystal layer may be arranged initially in a direction substantially perpendicular or substantially parallel to the substrate. Transparent electrodes are located on the substrates, respectively. When electric fields are generated in related pixels by applying voltages to the electrodes, the orientation of the liquid crystal molecules may vary to display the image. The liquid crystal molecules may be restored to an initial orientation state when the electric fields are not generated in the pixels.

The conventional transflective liquid crystal display device has a reflective region and a transmissive region through which light may pass. A reflection plate may be located in the reflective region. A liquid crystal layer may be continuously located in the reflective and the transmissive regions without dividing the liquid crystal layer in accordance with domains of pixels in the conventional transflective liquid crystal display device. As for the conventional transflective liquid crystal display device, pressure (e.g., predetermined pressure) may be applied to the liquid crystal device when a user touches a substrate of the liquid crystal display device to operate the liquid crystal display device. Thus, liquid crystal molecules in the liquid crystal layer may be undesirably orientated to cause strains or spots along portions of the substrate where the pressure is applied even though en electric field may not occur in a pixel of the liquid crystal display device. Additionally, the liquid crystal molecules might not be rapidly restored into an initial orientation state, thereby causing bruising of the liquid crystal molecules. Furthermore, adjacent portions of the liquid crystal layer may be continuously slopped by stress generated along the pressed portions of the substrate to thereby cause pooling of the liquid crystal molecules.

SUMMARY

Example embodiments provide liquid crystal display devices for controlling movement of a liquid crystal layer to prevent bruising and/or pooling phenomena of the liquid crystal display devices.

Example embodiments provide methods of manufacturing liquid crystal display devices capable of controlling movement of a liquid crystal layer to prevent bruising and/or pooling phenomena of the liquid crystal display devices.

According to example embodiments, there is provided a liquid crystal display device including a first substrate having a reflective region and a transmissive region, a second substrate corresponding to the first substrate, and a liquid crystal structure located between the first substrate and the second substrate, the liquid crystal structure including a first liquid crystal layer located in the reflective region and a second liquid crystal layer located in the transmissive region. The first liquid crystal layer may be configured to control movement of the second liquid crystal layer.

The first liquid crystal layer may include a polymer network and first liquid crystal molecules partially and/or totally dispersed in the polymer network.

The second liquid crystal layer may include second liquid crystal molecules oriented in a first direction.

The first liquid crystal layer may include a polymer droplet and first liquid crystal molecules partially and/or totally enclosed by the polymer droplet.

The liquid crystal display device may further include an isolation wall located between the reflective region and the transmissive region.

The first liquid crystal layer may include first liquid crystal molecules bordered by the isolation wall.

The liquid crystal display device may further include a first electrode located on a first face of the first substrate, a color filter located on a first face of the second substrate, and a second electrode located on the color filter.

The liquid crystal display device may further include a reflection layer located on the first electrode in the reflective region.

The liquid crystal display device may further include a first polarization plate located on a second face of the first substrate, and a second polarization plate located on a second face of the second substrate.

The color filter may be in the transmissive region, and the second electrode may contact the first face of the second substrate in the reflective region.

The liquid crystal display device may further include a light opening in the color filter and in the second electrode in the reflective region, wherein the light opening exposes the first liquid crystal layer.

The liquid crystal display device may further include a first polarization plate located on a second face of the first substrate, and a second polarization plate located between the first face of the second substrate and the color filter in the transmissive region.

The liquid crystal display device may further include a first polarization plate located on a second face of the first substrate, and a second polarization plate located between the color filter and the second electrode in the transmissive region.

According to example embodiments, there is provided a method of manufacturing a liquid crystal display device, the method including forming a first electrode on a first face of a first substrate having a reflective region and a transmissive region, forming a second electrode on a first face of a second substrate corresponding to the first substrate, combining the first substrate with the second substrate, and forming a liquid crystal structure between the first substrate and the second substrate, the liquid crystal structure including a first liquid crystal layer in the reflective region, and a second liquid crystal layer in the transmissive region, wherein the first liquid crystal layer is configured to control movement of the second liquid crystal layer.

The method may further include forming a reflection layer on the first electrode in the reflective region.

The method may further include forming a color filter between the first face of the second substrate and the second electrode.

The forming the liquid crystal structure may include forming a preliminary liquid crystal structure between the first substrate and the second substrate, covering the transmissive region with a first mask, and exposing the preliminary liquid crystal structure in the reflective region to a light by a first exposure process.

The preliminary liquid crystal structure may include monomers, photo initiator, and reactive mesogen mixed in liquid crystal molecules.

The forming the liquid crystal structure may include covering the reflective region with a second mask, and exposing the second liquid crystal layer in the transmissive region by a second exposure process while generating an electric field between the first substrate and the second substrate.

Each of the first exposure process and the second exposure process may include an ultraviolet (UV) light exposure process.

According to example embodiments, a liquid crystal display device may include a liquid crystal structure having a first liquid crystal layer and a second liquid crystal layer. The first liquid crystal layer may include a polymer network or a polymer droplet. First liquid crystal molecules in the first liquid crystal layer may be dispersed in the polymer network or the polymer droplet. The first liquid crystal layer may be located in a reflective region of the liquid crystal display device. The second liquid crystal layer may include second liquid crystal molecules oriented in a direction (e.g., a predetermined direction). The second liquid crystal layer may be formed in a transmissive region of the liquid crystal display device without dividing domains. The reflective region having the first liquid crystal layer may enclose the transmissive region having the second liquid crystal layer. Further, movement of the second liquid crystal layer may be controlled by the first liquid crystal layer or an isolation wall, and liquid crystal of the first liquid crystal layer may be confined by the polymer network or the polymer droplet. Therefore, the liquid crystal display device may effectively reduce or prevent some problems of the conventional liquid crystal display device such as pooling phenomena, bruising phenomena, etc. Additionally, the liquid crystal display may ensure enhanced reflectivity by the first liquid layer and a reflection layer without an additional process such as an embossing process. Furthermore, manufacturing processes and cost for the liquid crystal display device may be reduced because the liquid crystal structure may be obtained by a simplified process.

BRIEF DESCRIPTION OF THE DRAWINGS

Example embodiments may be understood in more detail from the following description taken in conjunction with the accompanying drawings, in which.

DETAILED DESCRIPTION OF THE EMBODIMENTS

Figure 1:
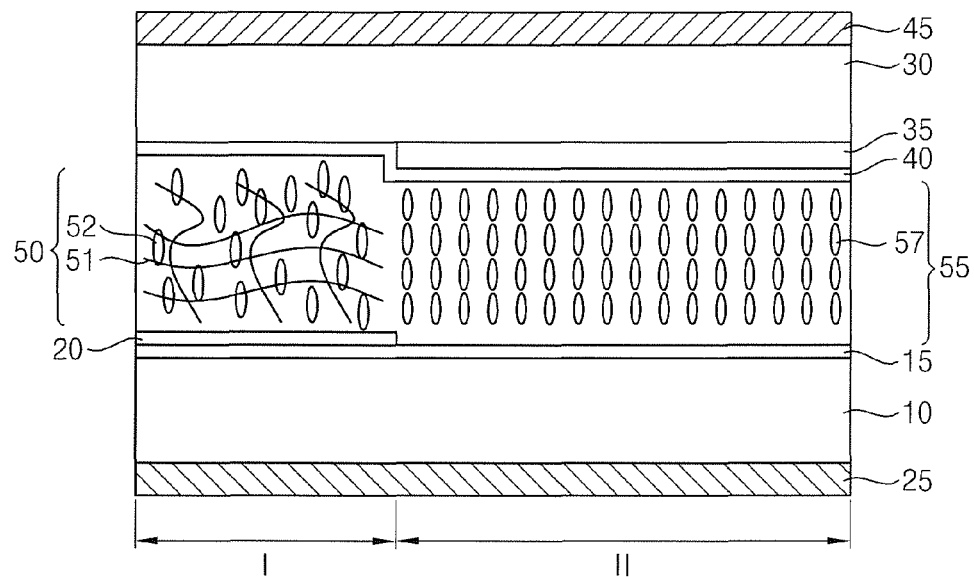
FIG. 1 is a cross sectional view illustrating a liquid crystal display device in accordance with example embodiments of the present invention.

The example embodiments are described more fully hereinafter with reference to the accompanying drawings. The present invention may, however, be embodied in many different forms, and should not be construed as limited to the example embodiments set forth herein. In the drawings, the sizes and relative sizes (e.g., proportions) of layers and regions may be exaggerated for clarity.

It will be understood that when an element or layer is referred to as being "on," "connected to," or "coupled to" another element or layer, it can be directly on, connected, or coupled to the other element or layer, or intervening elements or layers may be present. In contrast, when an element is referred to as being "directly on," "directly connected to," or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third, etc. may be used herein to describe various elements, components, regions, layers, patterns, and/or sections, these elements, components, regions, layers, patterns, and/or sections should not be limited by these terms. These terms are only used to distinguish one element, component, region, layer, pattern, or section from another region, layer, pattern, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

The terminology used herein is for the purpose of describing particular example embodiments only, and is not intended to limit the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the present invention. As such, variations from the shapes of the illustrations as a result, for example, of manufacturing techniques and/or tolerances, are to be expected. Thus, example embodiments should not be construed as limited to the particular shapes of regions illustrated herein, but are to include deviations in shapes that result, for example, from manufacturing. The regions illustrated in the figures are schematic in nature, and their shapes are not intended to illustrate the actual shape of a region of a device, and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

FIG. 1 is a cross sectional view illustrating a liquid crystal display device in accordance with example embodiments.

Referring to FIG. 1, a liquid crystal display device includes a first substrate 10, a second substrate 30 and a liquid crystal structure. The second substrate 30 may be substantially opposed to the first substrate 10 (e.g., the second substrate 30 may be opposite the first substrate 10 with respect to the liquid crystal structure). The liquid crystal structure may be located between the first substrate 10 and the second substrate 30.

In example embodiments, the liquid crystal display device may include a transflective liquid crystal display device. The transflective liquid crystal display device may have a reflective region I and a transmissive region II. In this case, the first substrate 10 and/or the second substrate 30 may also include the reflective region I and the transmissive region II. The liquid crystal structure may include a first liquid crystal layer 50 and a second liquid crystal layer 55. The first and the second liquid crystal layers 50 and 55 may be positioned in the reflective and the transmissive regions I and II, respectively.

Each of the first substrate 10 and the second substrate 30 may include a transparent insulating material, for example, glass, transparent plastic, transparent metal oxide, etc. In some example embodiments, a first face of the first substrate 10 may substantially correspond to a first face of the second substrate 30. That is, the first substrate 10 may substantially face the second substrate 30. Additionally, a second face of the first substrate 10 and a second face of the second substrate 30 may be substantially opposed to the first face of the first substrate 10 and the first face of the second substrate 30, respectively. The liquid crystal display device may have a construction wherein the first and the second substrates 10 and 30 are located substantially parallel to each other. Here, the first and the second substrates 10 and 30 may be arranged horizontally or vertically.

A first electrode 15 and a reflection layer 20 may be located on the first face of the first substrate 10. In example embodiments, a switching structure may be provided between the first substrate 10 and the first electrode 15. The switching structure may include wirings, switching devices, insulation layers, plugs, pads, contacts, conductive regions, etc. For example, the switching structure may include a gate line, a data line, a thin film transistor (TFT), a gate insulation layer, an insulation interlayer, a contact, etc. The first electrode 15 may be located in the reflective and the transmissive regions I and II. The reflection layer 20 may be located in the reflective region I of the first substrate 10.

In example embodiments, the first electrode 15 may correspond to a pixel electrode to which a data signal may be applied from wirings such as the data line. The first electrode 15 may have a first portion and a second portion located in the reflective region I and in the transmissive region II, respectively. In this case, the reflection layer 20 may be positioned on the first portion of the first electrode 15 in the reflective region I.

In example embodiments, the reflection layer 20 may directly make contact with the first electrode 15. The first electrode 15 may be electrically coupled to the switching device of the switching structure through the contacts, the plugs, the pads, etc. Thus, the reflection layer 20 may be electrically coupled to the switching device through the first electrode 15.

In some example embodiments, the first electrode 15 and the reflection layer 20 may be integrally formed without forming the first electrode 15 in the reflective region I. For example, the first electrode 15 may be located only in the transmissive region II of the first substrate 10, and the reflection layer 20 may be extended from the first electrode 15 into the reflective region I. In this case, the liquid crystal display device may have a cell gap in the reflective region I substantially the same as, or substantially similar to, a cell gap in the transmissive region II. That is, the liquid crystal display device may have substantially one cell gap in the reflective and the transmissive regions I and II.

The reflection layer 20 may include a material having a relatively high reflectivity. For example, the reflection layer 20 may include aluminum (Al), molybdenum (Mo), tungsten (W), chrome (Cr), titanium (Ti), platinum (Pt), silver (Ag), an alloy thereof, aluminum-silicon (Al—Si), titanium nitride (TiN$_x$), etc. These may be used alone or in a combination thereof. In example embodiments, the reflection layer 20 may have a level surface. Alternatively, the reflection layer 20 may include a plurality of protruding portions having a micro lens structure. Furthermore, the reflection layer 20 may have a structure that includes isolated particles (islands) on the first electrode 15.

In example embodiments, first liquid crystal molecules 52 in the first liquid crystal layer 50 and in the reflection layer 20 may reflect light incident into the reflective region I, such that the liquid crystal display device may ensure enhanced reflection efficiency without an additional process for improving a reflectivity of the reflection layer 20, such as an embossing process.

The first electrode 15 may include a transparent conductive material. For example the first electrode 15 may include indium tin oxide (ITO; InSn$_x$O$_y$), indium zinc oxide (IZO; InZn$_x$O$_y$), indium oxide (InO$_x$), zinc oxide (ZnO$_x$), tin oxide (SnO$_x$), titanium oxide (TiO$_x$), antimony tin oxide (ATO;

SbSn$_x$O$_y$), fluorine tin oxide (FSn$_x$O$_y$; FTO), gallium oxide (GaO$_x$), gallium indium oxide (GIO; GaIn$_x$O$_y$), etc. These may be used alone or in a combination thereof.

A first polarization plate 25 may be located on the second face of the first substrate 10. The first polarization plate 25 may have a first light axis substantially perpendicular to the liquid crystal structure. Alternatively, the first light axis of the first polarization plate 25 may be substantially parallel to the liquid crystal structure.

A color filter 35 and a second electrode 40 may be located on the first face of the second substrate 30. The color filter 35 may be positioned in the transmissive region II. The second electrode 40 may include a first portion and a second portion located in the reflective region I and the transmissive region II, respectively. In example embodiments, the second electrode 40 may correspond to a common electrode shared by a plurality of pixels of the liquid crystal display device. The first portion of the second electrode 40 may directly contact the first face of the second substrate 30, and the second portion of the second electrode 40 may cover the color filter 35.

In example embodiments, a plurality of color filters 35 may be located on the first face of the second substrate 30 in the transmissive region II of the liquid crystal display device, such that the color filters 30 may selectively filter related colors of light passing through the liquid crystal structure. For example, the color filters 30 may include red color filters for red (R) lights, green color filters for green (G) lights, blue color filters for blue (B) lights, etc.

The second electrode 40 may include a transparent conductive material. For example, the second electrode 40 may include indium tin oxide (ITO), indium zinc oxide (IZO), indium oxide, zinc oxide, tin oxide, titanium oxide, antinomy tin oxide (ATO), fluorine tin oxide (FTO), gallium oxide, gallium tin oxide (GTO), etc. These may be used alone or in a combination thereof.

In example embodiments, the liquid crystal display device may have a first cell gap in the reflective region I substantially larger than a second cell gap in the transmissive region II because of the color filter 30 located in the transmissive region II. In some example embodiments, the first cell gap in the reflective region I may be substantially the same as, or substantially similar to, the second cell gap in the transmissive region II, by extending the color filter 30 to the reflective region I, or by adjusting a construction of the reflection layer 20 and/or the first electrode 15. Namely, the liquid crystal display device may have a substantially single (e.g., singular, or undivided) cell gap in the reflective and the transmissive regions I and II.

A second polarization plate 45 may be located on the second face of the second substrate 30. The second polarization plate 45 may have a second light axis substantially perpendicular to the first light axis of the first polarization plate 25. Alternatively, the second light axis of the second polarization plate 45 may be substantially parallel to the first light axis of the first polarization plate 25.

Referring now to FIG. 1, the liquid crystal display device may include the first liquid crystal layer 50 and the second liquid crystal layer 55 positioned in the reflective region I and the transmissive region II, respectively. The first liquid crystal layer 50 may include polymer networks 51 and a plurality of first liquid crystal molecules 52. Some of the first liquid crystal molecules 52 may be partially and/or entirely dispersed in the polymer networks 51, and others of the first liquid crystal molecules 52 may be deviated from the polymer networks 51. The second liquid crystal layer 55 may include a plurality of second liquid crystal molecules 57. The second liquid crystal molecules 57 may be arranged in a first direction (e.g., a predetermined direction) between the first electrode 15 and the second electrode 40. For example, the second liquid crystal molecules 57 may be arranged substantially perpendicular to or substantially parallel to the first and the second electrodes 15 and 40 when an electric field is not generated between the first and the second electrodes 15 and 40.

In example embodiments, the liquid crystal structure may have a construction in which some of the first liquid crystal molecules 52 may be totally or partially located in or captured in the polymer networks 51 having a chain structure in the reflective region I. Others of the first liquid crystal molecules 52 may be positioned between the polymer networks 51. The liquid crystal structure may include the second liquid crystal molecules 57 arranged substantially perpendicular to or substantially parallel to the first substrate 10 and/or the second substrate 30 in the transmissive region II. The second liquid crystal molecules 57 may be arranged without dividing domains of the pixels in the transmissive region II. The liquid crystal display device may include one liquid crystal structure having different constructions in the reflective and the transmissive regions I and II. In this case, the first liquid crystal molecules 52 may have a first density substantially less than a second density of the second liquid crystal molecules 57. That is, the liquid crystal structure may have a density difference of liquid crystal molecules between the reflective and the transmissive regions I and II. In other words, the number of the second liquid crystal molecules 57 in the transmissive region II may be substantially larger that the number of the first liquid crystal molecules 52 in the reflective region I.

The polymer networks 51 in the first liquid crystal layer 50 may be obtained using reactive mesogen (RM), monomers for photo polymerization, photo initiator, etc. Examples of the reactive mesogen in the polymer networks 51 may include monomer reactive mesogen, δ reactive mesogen, polymer reactive mesogen, etc. In example embodiments, the polymer networks 51 in the first liquid crystal layer 50 may be in a range of about 5% to about 50% by weight based on a total weight of the first liquid crystal layer 50. The first liquid crystal molecules 52 may be dispersed in the polymer networks 51, may be partially captured by the polymer networks 51, or may be separated from the polymer networks 51.

According to example embodiments, movement of the first liquid crystal molecules 52 may be controlled or confined by the polymer networks 51 in the reflective region I of the liquid crystal display device. Therefore, pooling and/or bruising phenomena of the liquid crystal display device caused by continuous sloshing of the first liquid crystal molecules 52 may be reduced or prevented by the polymer networks 51 in the reflective region I. Further, the first liquid crystal layer 50 may enclose the second liquid crystal layer 55 (e.g., the first liquid crystal layer 50 may act as a barrier to the second liquid crystal layer 55) to control movement of second liquid crystal molecules 57. Namely, the reflective region I having the first liquid crystal layer 50 may surround the transmissive region II having the second liquid crystal layer 55 to thereby confine or control sloshing of the second liquid crystal molecules 57. As a result, the pooling and/or bruising phenomena of the liquid crystal display device may be more effectively reduced or prevented.

Figure 2:
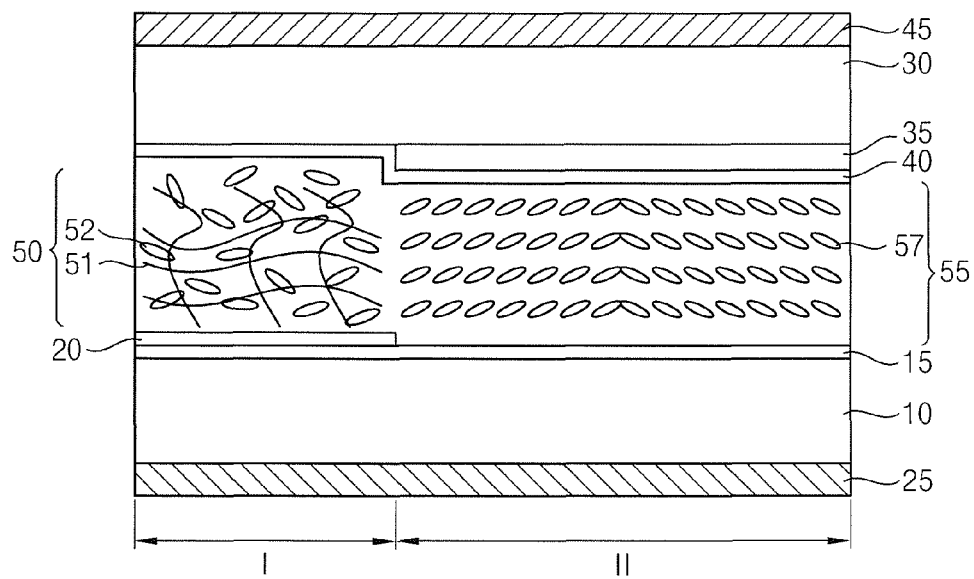
FIG. 2 is a cross sectional view illustrating an operation of a liquid crystal display device in accordance with example embodiments.

FIG. 2 is a cross sectional view illustrating an operation of a liquid crystal display device in accordance with example embodiments. In example embodiments, the liquid crystal display device illustrated in FIG. 2 may be operated in a white mode when the liquid crystal display device illustrated in FIG. 1 is operated in a black mode.

As illustrated in FIG. 1, when the liquid crystal display device has a vertical arrangement (VA) mode, light passing through the first polarization plate 25 may not penetrate the second polarization plate 45 having the second light axis substantially perpendicular to the first light axis of the first polarization plate 25 when an electric field is not generated between the first electrode 15 and the second electrode 40. Thus, the liquid crystal display device may be operated in the black mode. That is, the first and the second liquid crystal molecules 52 and 57 in the reflective and the transmissive regions I and II may be oriented along a direction substantially perpendicular to the first substrate 10 and/or the second substrate 30 when voltages are not applied to the first electrode 15 and/or the second electrode 40. Therefore, phase difference of light passing through the first and the second liquid crystal molecules 52 and 57 may not occur, so that the liquid crystal display device may be in the black mode.

Referring to FIG. 2, when voltages (e.g., predetermined voltages) are applied to the first electrode 15 and/or the second electrode 40, an electric field may be generated between the first and the second electrodes 15 and 40. Thus, the first and the second liquid crystal molecules 52 and 57 in the reflective and the transmissive regions I and II may be oriented along the electric field such that the liquid crystal display device may be operated in a white mode. In this case, light incident into the reflective region I may be reflected by the reflection layer 20, while the light may be scattered by the first liquid crystal molecules 52. Hence, the liquid crystal display device may ensure more improved reflection efficiency. For example, the first and the second liquid crystal molecules 52 and 57 may be arranged in a direction (e.g., a predetermined direction) when the electric field is generated between the first and the second electrodes 15 and 40. Here, the second liquid crystal molecules 52 in the transmissive region II may be oriented in a direction substantially parallel to the first and the second electrodes 15 and 40, whereas the first liquid crystal molecules 52 in the reflective region I may be generally arranged in parallel to the first and the second electrodes 15 and 40. That is, the first liquid crystal molecules 52 might not be exactly oriented in a direction substantially parallel to the first and the second electrodes 15 and 40 because the first liquid crystal molecules 52 may be totally or partially dispersed in the polymer networks 51. These first liquid crystal molecules 52 captured by the polymer networks 51 may be arranged in a random direction. The light incident in the reflective region I may be scattered by a difference of reflection index between the first liquid crystal molecules 52 and the polymer networks 51, and also phase difference of the lights may occur by the first liquid crystal molecules 52 in the reflective region I. Thus, the liquid crystal display device may be operated in the white mode.

According to example embodiments, the reflective region I having the polymer networks 51 and the first liquid crystal molecules 52 may enclose the transmissive region II having the second liquid crystal molecules 57. Therefore, the reflective region I may serve as an isolation member, such as an isolation wall, for isolating the adjacent transmissive region II. When the first substrate 10 and/or the second substrate 30 may be pressed by a user, undesired movement of the second liquid crystal molecules 57 in the transmissive region II may be reduced, prevented, or confined by the reflective region I. Therefore, continuous movement of the second liquid crystal molecules 57 may be effectively reduced or prevented by the reflective region I while using the liquid crystal display device, so that pooling phenomena of the liquid crystal display device may be reduced or prevented, and also bruising phenomena of the liquid crystal display device may be reduced or suppressed by improving restoration speed of the second liquid crystal molecules 57 toward initial orientation of the second liquid crystal molecules 57.

Although the liquid crystal display device having the vertical alignment mode is described with reference to FIGS. 1 and 2, the liquid crystal structure according to example embodiments may be employed in other liquid crystal display devices having various modes, such as an in-plane switching (IPS) mode, a fringe field switching (FFS) mode, a twisted nematic (TW or TN) mode, an electrically controlled birefringence (ECB) mode, etc.

Figure 3:
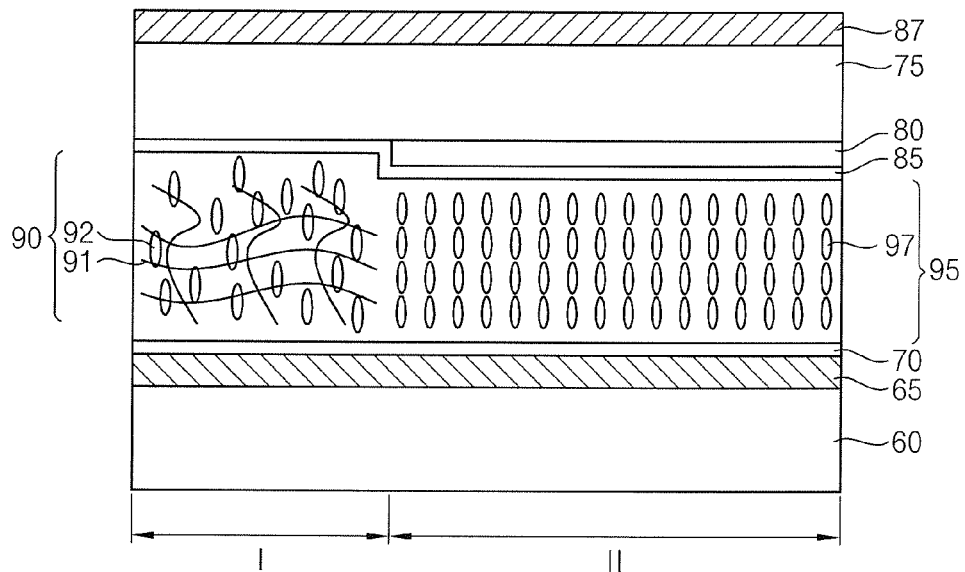
FIG. 3 is a cross sectional view illustrating a liquid crystal display device in accordance with some example embodiments.

FIG. 3 is a cross sectional view illustrating a liquid crystal display device in accordance with some example embodiments. The liquid crystal display device illustrated in FIG. 3 may have a construction substantially the same as, or substantially similar to, that of the liquid crystal display device described with reference to FIG. 1 except for a first polarization plate and a reflection layer.

Referring to FIG. 3, a liquid crystal display device includes a first substrate 60, a first polarization plate 65, a first electrode 70, a liquid crystal structure, a second substrate 75, a color filter 80, a second electrode 85, and a second polarization plate 87. Each of the first substrate 60 and the second substrate 75 may have a reflective region I and a transmissive region II.

In example embodiments, the first polarization plate 65 may be located on a first face of the first substrate 60, and the first electrode 70 may be located on the first polarization plate 65. The first polarization plate 65 may have a first light axis substantially perpendicular to or substantially parallel to the first substrate 60 in accordance with an orientation mode of the liquid crystal display device.

The first electrode 70 may include a transparent conductive material. For example, the first electrode 70 may include metal, alloy, metal compound, etc. The first electrode 70 may be positioned in the reflective region I and the transmissive region II of the first substrate 60. Since the first polarization plate 65 may be located on the first substrate 60, the first electrode 70 might not directly contact the first face of the first substrate 60.

The color filter 80 may be located on a first face of the second substrate 75 substantially corresponding to the first face of the first substrate 60 (e.g., the color filter 80 may be located between the first face of the second substrate 75 and the first face of the first substrate 60). The color filter 80 may be positioned in the transmissive region II of the second substrate 75. As described above, the liquid crystal display device may include a plurality of color filters 80 for selectively filtering red light, green light, and/or blue light in the transmissive region II.

The second electrode 85 may cover the color filter 80 in the transmissive region II, whereas the second electrode 85 may directly make contact with the first face of the second substrate 75 in the reflective region I. Thus, the second electrode 85 may have a step between the reflective region I and the transmissive region II. The second electrode 85 may also include a transparent conductive material. For example, the second electrode 85 may include metal, alloy, metal compound, etc.

The second polarization plate 87 may be located on a second face of the second substrate 75 substantially opposed to (e.g., opposite) the first face of the second substrate 75. The second polarization plate 87 may have a second light axis substantially perpendicular to, or substantially parallel to, the second substrate 75. That is, the second light axis of the second polarization plate 87 may be substantially parallel to, or substantially perpendicular to, the first light axis of the first polarization plate 65.

The liquid crystal structure may include a first liquid crystal layer 90 in the reflective region I, and a second liquid crystal layer 95 in the transmissive region II. The first liquid crystal layer 90 may have polymer networks 91 and first liquid crystal molecules 92 that are partially and/or entirely dispersed in the polymer networks 91. Further, some of the first liquid crystal molecules 92 may be located between the polymer networks 91. That is, some of the first liquid crystal molecules 92 may be deviated from the polymer networks 91. The second liquid crystal layer 95 may include second liquid crystal molecules 97 oriented in a first direction (e.g., a predetermined direction) in accordance with the operation mode of the liquid crystal display device. In example embodiments, the polymer networks 91 and the first liquid crystal molecules 92 may have constructions substantially the same, as or substantially similar to, those of the polymer networks and the first liquid crystal molecules described with reference to FIG. 1.

In example embodiments, the first liquid crystal molecules 92 dispersed in the polymer networks 91 or spaced apart from the polymer networks 91 may reflect or scatter light incident into the first liquid crystal layer 90, so the liquid crystal display device may effectively reflect the light without an additional reflection layer in the reflective region I.

In some example embodiments, the liquid crystal display device may further include a layer having reflectivity, such as an enhanced specular reflector (ESR), in a back light assembly for providing light into the liquid crystal structure. In this case, the layer having reflectivity may also reflect the light incident into the first liquid crystal layer 90, so that the liquid crystal display device may have improved reflectivity by a combination of the first liquid crystal molecules 92 and the layer having reflectivity.

Figure 4:
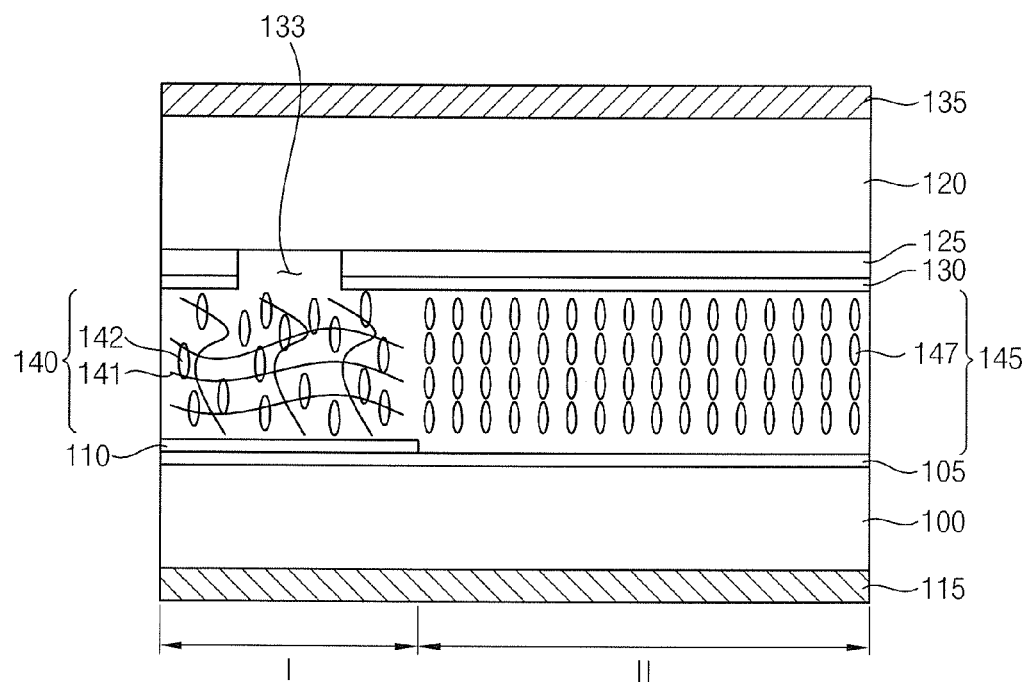
FIG. 4 is a cross sectional view illustrating a liquid crystal display device in accordance with some example embodiments.

FIG. 4 is a cross sectional view illustrating a liquid crystal display device in accordance with some example embodiments. The liquid crystal display device illustrated in FIG. 4 may have a construction substantially the same as, or substantially similar to, that of the liquid crystal display device described with reference to FIG. 1 except for a color filter and a second electrode.

Referring to FIG. 4, a liquid crystal display device may include a first substrate 100, a second substrate 120 corresponding to the first substrate 100, and a liquid crystal structure located between the first and the second substrates 100 and 120. Each of the first and the second substrates 100 and 120 has a reflective region I and a transmissive region II.

The liquid crystal structure may include a first liquid crystal layer 140 and a second liquid crystal layer 145 positioned in the reflective region I and the transmissive region II, respectively. The first liquid crystal layer 140 may include polymer networks 141 and first liquid crystal molecules 142. The first liquid crystal molecules may partially and/or entirely dispersed in the polymer networks 141, or may be spaced apart from the polymer networks 141. The second liquid crystal layer 145 may have second liquid crystal molecules 147. The second liquid crystal molecules 147 may be arranged along an initial direction according to an operation mode of the liquid crystal display device.

A first electrode 105 may be located on a first face of the first substrate 100. A reflection layer 110 may be located on the first electrode 105 in the reflective region I. In example embodiments, the first electrode 105 may extend from the reflective region I to the transmissive region II. The reflection layer 110 may be positioned only in the reflective region I. A first polarization plate 115 may be located on a second face of the first substrate 100 substantially opposed to the first face of the first substrate 100.

A color filter 125 may be located on a first face of the second substrate 120 substantially corresponding to the first face of the first substrate 100. A second electrode 130 may be located on the color filter 125. A second polarization plate 135 may be positioned on a second face of the second substrate 120 substantially opposed to the first face of the second substrate 120.

As illustrated in FIG. 4, the color filter 125 and the second electrode 130 may be positioned from the transmissive region II to the reflective region I. A light opening or a light hole 133 may be formed through portions of the color filter 125 and the second electrode 130 in the reflective region I. That is, the light opening or the light hole 133 may be positioned in the reflective region I only. The light opening or the light hole 133 may partially expose the first liquid crystal layer 140. External light incident into the reflective region I may be reflected by the first liquid crystal layer 140 through the light opening or the light hole 133.

In example embodiments, the liquid crystal display device may have a transflective type. Here, the liquid crystal display device may include the liquid crystal structure for controlling movement of the first liquid crystal molecules 142 and/or movement of the second liquid crystal molecules 147. Therefore, the liquid crystal display device may reduce or prevent pooling of the first liquid crystal molecules 142 and/or the second liquid crystal molecules 147 caused by touch pressure relative to the first substrate 100 and/or the second substrate 120. Further, the liquid crystal display device may effectively reduce or prevent restoration delay of the second liquid crystal molecules 147 toward initial orientation state.

Figure 5:
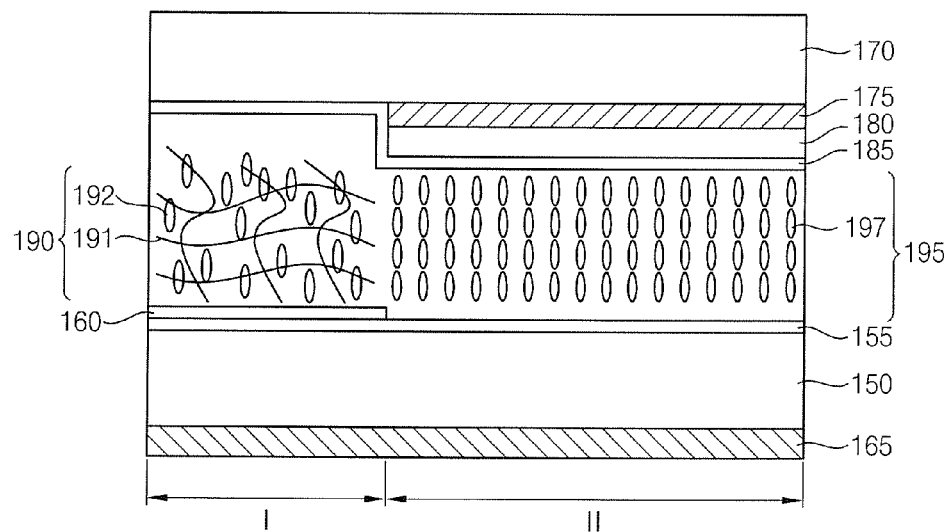
FIG. 5 is a cross sectional view illustrating a liquid crystal display device in accordance with some example embodiments.

FIG. 5 is a cross sectional view illustrating a liquid crystal display device in accordance with some example embodiments. The liquid crystal display device illustrated in FIG. 5 may have a construction substantially the same as, or substantially similar to, that of the liquid crystal display device described with reference to FIG. 1 except for a second polarization plate.

Referring to FIG. 5, a liquid crystal display device may include a first substrate 150, a first electrode 155, a reflection layer 160, a first polarization plate 165, a liquid crystal structure, a second substrate 170, a second polarization plate 175, a color filter 180, and a second electrode 185.

The liquid crystal display device may have a reflective region I and a transmissive region II, and thus, each of the first substrate 150 and the second substrate 170 may also have the reflective and the transmissive regions I and II.

The first electrode 155 and the reflection layer 160 may be located on a first face of the first substrate 150, and the first polarization plate 165 may be located beneath a second face of the first substrate 150. The first electrode 155 and the first polarization plate 165 may be positioned in the reflective and the transmissive regions I and II. The reflection layer 160 might be located only in the reflective region I.

The liquid crystal structure may include a first liquid crystal layer 190 and a second liquid crystal layer 195. The first and the second liquid crystal layers 190 and 195 may be positioned in the reflective and the transmissive regions I and II, respectively. The first liquid crystal layer 190 may include polymer networks 191 and first liquid crystal molecules 192. The second liquid crystal layer 195 includes second liquid crystal molecules 197.

The second polarization plate 175, the color filter 180, and the second electrode 185 may be located beneath a first face of the second substrate 170. The second polarization plate 175 and the color filter 180 may be positioned in the transmissive region II of the second substrate 170. The second electrode 185 may extend from the transmissive region II to the reflective region I. In this case, the second electrode 185 may directly make contact with the first face of the second substrate 170 in the reflective region I, whereas the second electrode 185 may directly contact the color filter 180 in the transmissive region II. The second polarization plate 175 may directly contact the first face of the second substrate 170 in the transmissive region II. Namely, the second electrode 185 may cover the color filter 180 in the transmissive region II. Thus, the second electrode 185 may have a stepped portion between the reflective and the transmissive regions I and II because each of the second polarization plate 175 and the color filter 180 may have a thickness (e.g., a predetermined thickness) in the transmissive region II.

In example embodiments, the liquid crystal display device may ensure enhanced light reflectivity in the reflective region I since the second polarization plate 175 may be positioned between the second substrate 170 and the color filter 180 in only the transmissive region II and not the reflective region I.

Figure 6:
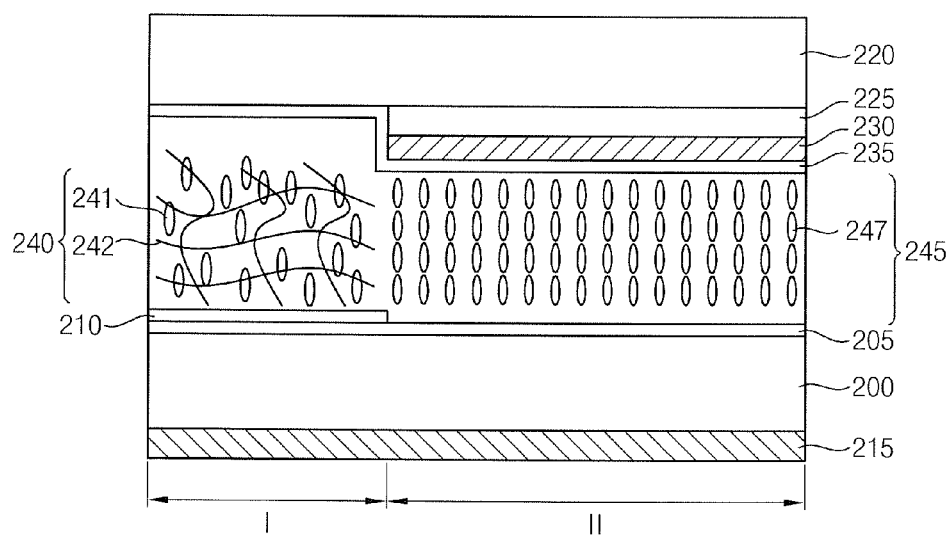
FIG. 6 is a cross sectional view illustrating a liquid crystal display device in accordance with example embodiments.

FIG. 6 is a cross sectional view illustrating a liquid crystal display device in accordance with example embodiments. The liquid crystal display device illustrated in FIG. 6 may have a construction substantially the same as, or substantially similar to, that of the liquid crystal display device described with reference to FIG. 1 or FIG. 5 except for a second polarization plate.

Referring to FIG. 6, a liquid crystal display device may include a first substrate 200, a first polarization plate 215, a first electrode 205, a reflection layer 210, a liquid crystal structure, a second substrate 220, a color filter 225, a second polarization plate 230, and a second electrode 235.

The liquid crystal structure may have a first liquid crystal layer 240 and a second liquid crystal layer 245 located, respectively, in a reflective region I and a transmissive region II of the liquid crystal display device. The first liquid crystal layer 240 may include first liquid crystal molecules 241 and polymer networks 242, and the second liquid crystal layer 245 may have second liquid crystal molecules 247. Some of the first liquid crystal molecules 241 may be partially and/or totally captured by the polymer networks 242. Others of the first liquid crystal molecules 241 may be separated from the polymer networks 242. The second liquid crystal molecules 247 may be initially oriented in a first direction (e.g., a predetermined direction) in accordance with an orientation mode of the liquid crystal display device.

In example embodiments, the color filter 225 and the second polarization plate 230 might be located only in the transmissive region II of the liquid crystal display device. Here, the color filter 225 may directly contact the second substrate 220, and the second polarization plate 230 may be located between the color filter 225 and the second electrode 235. The second electrode 235 may contact the second substrate 220 in the reflective region I.

The reflection layer 210 may be positioned only in the reflective region I of the liquid crystal display device, whereas the first polarization plate 215 and the first electrode 205 may be located in both of the reflective and the transmissive regions I and II. As described above, the reflection layer 210 may be omitted because the first liquid crystal molecules 241 may be partially and/or entirely dispersed in the polymer networks 242, or may be spaced apart from the polymer networks 242.

Figure 7:
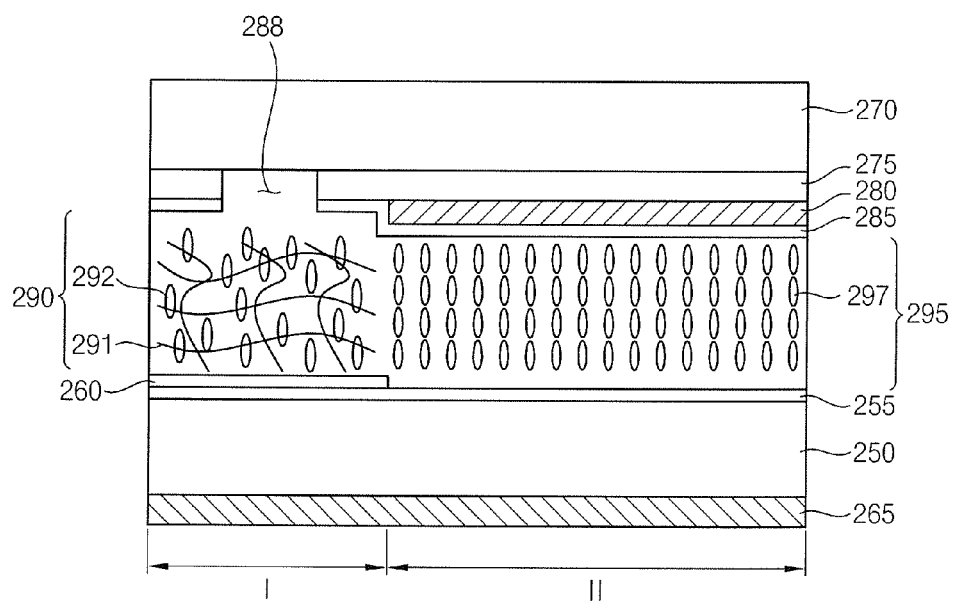
FIG. 7 is a cross sectional view illustrating a liquid crystal display device in accordance with example embodiments.

FIG. 7 is a cross sectional view illustrating a liquid crystal display device in accordance with example embodiments. The liquid crystal display device illustrated in FIG. 7 may have a structure substantially the same as, or substantially similar to, that of the liquid crystal display device described with reference to FIG. 1, FIG. 4, or FIG. 6 except for the form of a color filter and a second polarization plate.

Referring to FIG. 7, a liquid crystal display device may have a first substrate 250, a first polarization plate 265, a first electrode 255, a reflection layer 260, a liquid crystal structure, a second substrate 270, a color filter 275, a second polarization plate 280, and a second electrode 285.

The liquid crystal structure may include a first liquid crystal layer 290 and a second liquid crystal layer 295 positioned respectively in a reflective region I and in a transmissive region II of the liquid crystal display device. The first liquid crystal layer 290 may have first liquid crystal molecules 292 and polymer networks 291, and the second liquid crystal layer may include second liquid crystal molecules 297 oriented along a first direction (e.g., a predetermined direction). Some of the first liquid crystal molecules 292 may be partially and/or totally dispersed in the polymer networks 291, and others of the first liquid crystal molecules 292 may be separated from the polymer networks 291.

The first electrode 255 and the first polarization plate 265 may be located in the reflective and the transmissive regions I and II. The first electrode 255 may be positioned on a first face of the first substrate 250, and the first polarization plate 265 may be located beneath (or on) a second face of the first substrate 250. The reflection layer 260 may be positioned on a portion of the first electrode 255 in the reflective region I.

In example embodiments, the color filter 275 may be located on an entire first face of the second substrate 270. That is, the color filter 275 may be positioned in both of the reflective and the transmissive regions I and II of the liquid crystal display device. The second polarization plate 280 may be located only in the transmissive region II. The second electrode 285 may cover the second polarization plate 280 in the transmissive region II, whereas the second electrode 285 may cover the color filter 275 in the reflective region I.

According to example embodiments, a light hole or a light opening 288 may be provided through the color filter 275 and the second electrode 285 in the reflective region I of the liquid crystal display device. Light incident into the reflective region I may be reflected by the first liquid crystal molecules 292 and the reflection layer 260 through the light hole or the light opening 288 and toward the outside of the first liquid crystal layer 290.

Figure 8:
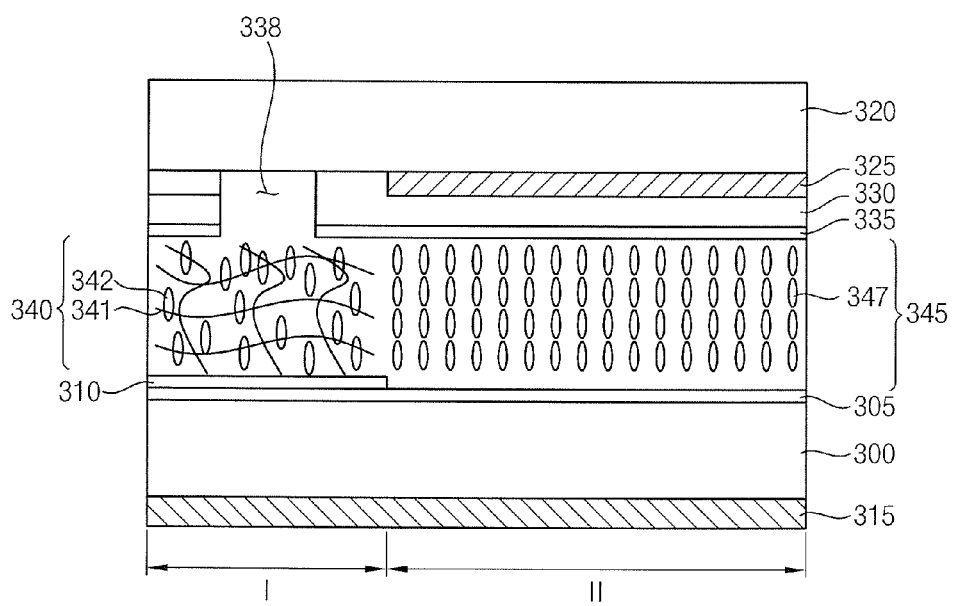
FIG. 8 is a cross sectional view illustrating a liquid crystal display device in accordance with example embodiments.

FIG. 8 is a cross sectional view illustrating a liquid crystal display device in accordance with example embodiments. The liquid crystal display device illustrated in FIG. 8 may have a structure substantially the same as, or substantially similar to, that of the liquid crystal display device described in accordance with FIG. 7 or FIG. 4, except for a position of a second polarization plate.

Referring to FIG. 8, a liquid crystal display device may include a first substrate 300, a second substrate 320, and a liquid crystal structure positioned between the first and the second substrates 300 and 320.

The liquid crystal structure may include a first liquid crystal layer 340 and a second liquid crystal layer 345. The first liquid crystal layer 340 and the second liquid crystal layer 345 may be located in a reflective region I and a transmissive region II, respectively. The first liquid crystal layer 340 may include polymer networks 341 and first liquid crystal molecules 342. The second liquid crystal 345 may have second liquid crystal molecules 347. Here, the second liquid crystal molecules 347 may be initially oriented in a direction (e.g., a predetermined direction) by an emission exposure process as described below.

A first electrode 305 and a reflection layer 310 may be located on a first face of the first substrate 300. A first polarization plate 315 may be located on a second face of the first substrate 300. The first electrode 305 may be positioned in the reflective and the transmissive regions I and II of the first substrate 300. The reflection layer 310 may be located only in the reflection region I of the liquid crystal display device. However, the reflection layer 310 may also be omitted because of the first liquid crystal molecules 342 as described above.

A second polarization plate 325, a color filter 330, and a second electrode 335 may be sequentially located on a first face of the second substrate 320 substantially corresponding to (e.g., facing) the first face of the first substrate 300. The second polarization plate 325 may be located only in the transmissive region II of the liquid crystal display device. The color filter 330 and the second electrode 335 may be located in both of the reflective and the transmissive regions I and II. In the transmissive region II of the liquid crystal display device, the second polarization plate 325 may be covered with the color filter 330, and the color filter 330 may be covered with the second electrode 335. In the reflective region I of the liquid crystal display device, a light opening or a light hole 338 may be formed through the color filter 330 and the second electrode 335. The light hole 338 may expose the first liquid crystal layer 340. Light incident into the reflective region I may be reflected by the reflection layer 310 and the first liquid crystal molecules 342 through the light hole 338.

In example embodiments, the liquid crystal display device may have the color filter 330 and the second electrode 355 located in both of the reflective and the transmissive regions I and II. Therefore, the liquid crystal display device may have substantially single (e.g., singular, or undivided) cell gap in the reflective and the transmissive regions I and II without requiring an additional element or modified constructions of elements.

Figure 9:
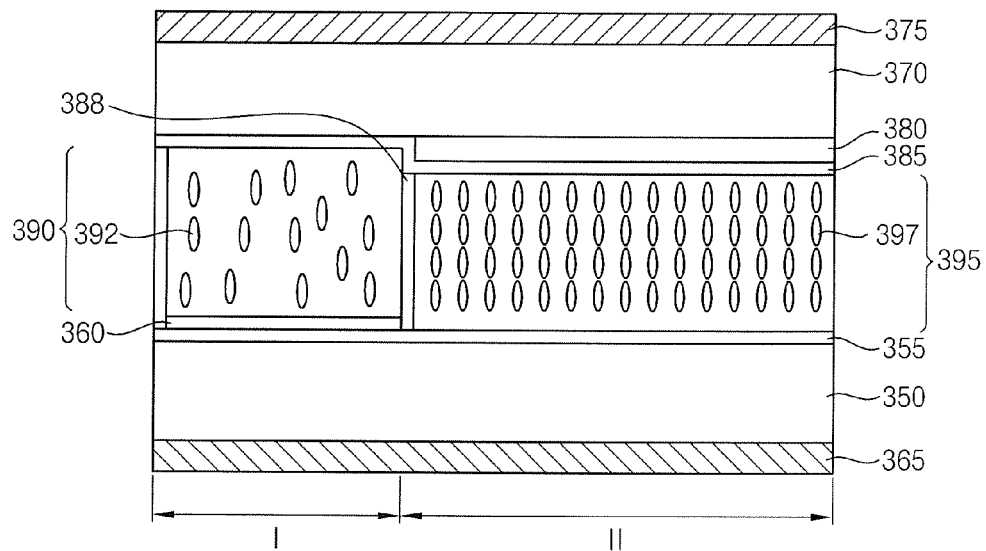
FIG. 9 is a cross sectional view illustrating a liquid crystal display device in accordance with example embodiments.

FIG. 9 is a cross sectional view illustrating a liquid crystal display device in accordance with example embodiments. The liquid crystal display device In FIG. 9 may have a construction substantially the same as, or substantially similar to, that of the liquid crystal display device described with reference to FIG. 1, FIG. 3, FIG. 5, or FIG. 6 expect for a liquid crystal structure and the presence of an isolation wall.

Referring to FIG. 9, a liquid crystal display device may include a first substrate 350, a first polarization plate 365, a first electrode 355, a reflection layer 360, a liquid crystal structure, a second substrate 370, a second polarization plate 375, a color filter 380, a second electrode 385, and an isolation wall 388.

The liquid crystal structure may include a first liquid crystal layer 390 in a reflection region I, and a second liquid crystal layer 395 located in a transmissive region II. The first liquid crystal layer 390 may have first liquid crystal molecules 392 and the second liquid crystal layer 395 may include second liquid crystal molecules 397. In example embodiments, the first and the second liquid crystal molecules 392 and 397 may be arranged in a direction (e.g., a predetermined direction) according to an operation mode of the liquid crystal display device. For example, the first and the second liquid crystal molecules 392 and 397 may be oriented by an emission exposure process.

In example embodiments, the first liquid crystal molecules 392 in the reflective region I may have a density substantially lower than that of the second liquid crystal molecules 397 in the transmissive region II. That is, the number of the first liquid crystal molecules 392 may be smaller than the number of the second liquid crystal molecules 397. In some example embodiments, the first liquid crystal layer 390 may further include polymer networks, as described above.

The first electrode 355 and the reflection layer 360 are positioned on a first face of the first substrate 350. The first polarization plate 365 may be located beneath a second face of the first substrate 350. The reflective layer 360 may be formed in the reflective region I. The color filter 380 and the second electrode 385 may be located beneath a first face of the second substrate 370. The color filter 380 may be positioned in the transmissive region II. The second polarization plate 375 may be located on a second face of the second substrate 370.

The isolation wall 388 may include a transparent insulating material. For example, the isolation wall 388 may include transparent plastic, transparent metal oxide, photoresist, glass, etc. The isolation wall 388 may be located at a peripheral portion of the reflective region I. That is, the isolation wall 388 may be positioned between the reflective region I and the transmissive region II. The reflective region I may enclose the transmissive region II, so that the isolation wall 388 may also surround the transmissive region II. Therefore, the isolation wall 388 may efficiently prevent or limit movement of the liquid crystal molecules 397 (e.g., from moving into the reflective region I). The isolation wall 388 may further serve as a member for ensuring a cell gap of the liquid crystal display device, such as a column spacer. Thus, the liquid crystal display device may not require the element for ensuring the cell gap when the liquid crystal display device has the isolation wall 388.

In example embodiments, the isolation wall 388 may be between the first electrode 355 and the second electrode 385 in the reflective region I. That is, the isolation wall 388 may make contact with the first and the second electrodes 355 and 385. However, the isolation wall 388 may not be directly positioned on the reflection layer 360. For example, both end portions of the reflection layer 360 may contact lower lateral portions of adjacent isolation walls 388. In other words, the reflection layer 360 may be confined by the isolation wall 388.

Figure 10:
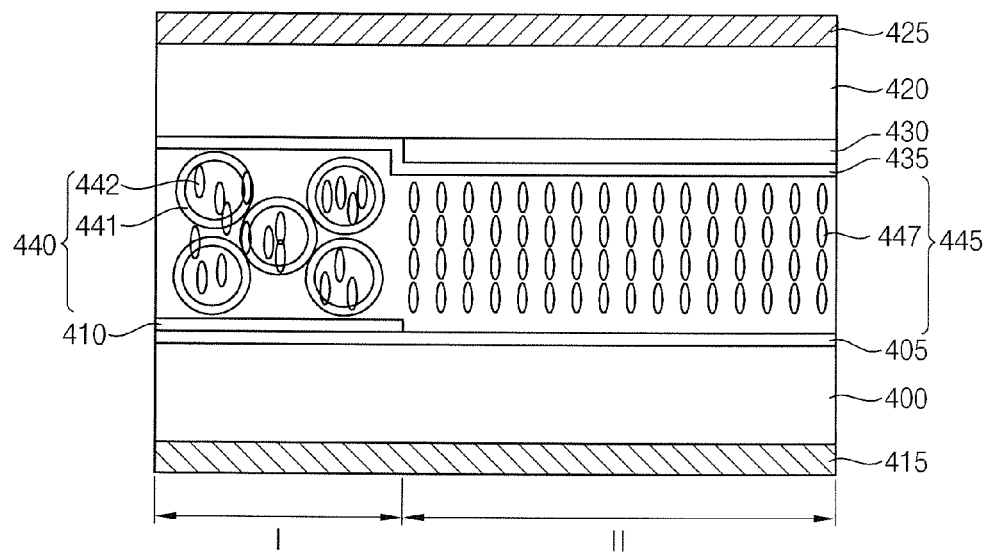
FIG. 10 is a cross sectional view illustrating a liquid crystal display device in accordance with example embodiments.

FIG. 10 is a cross sectional view illustrating a liquid crystal display device in accordance with example embodiments. The liquid crystal display device illustrated in FIG. 10 may have a construction substantially the same as, or substantially similar to, that of the liquid crystal display device described with reference to FIG. 1.

Referring to FIG. 10, a liquid crystal display device may have a first substrate 400, a second substrate 420 and a liquid crystal structure located between the first and the second substrates 400 and 420. The liquid crystal structure may include a first liquid crystal layer 440 and a second liquid crystal layer 445 positioned in a reflective region I and a transmissive region II, respectively.

A first electrode 405 and a reflection layer 410 may be located on a first face of the first substrate 400. A first polarization plate 415 may be located on a second face of the first substrate 400. A color filter 430 may be located on a first face of the second substrate 420 in the transmissive region II. A second electrode 435 may be positioned on the first face of the second substrate 420 to cover the color filter 430. A second polarization plate 425 may be located on a second face of the second substrate 420.

In example embodiments, the first liquid crystal layer 440 of the liquid crystal structure may have first liquid crystal molecules 442 and polymer droplets 441. The first liquid crystal molecules 442 may be partially and/or totally enclosed by the polymer droplets 441. Further, the first liquid crystal molecules 442 may be separated from the polymer droplets 441. The polymer droplets 441 may have compositions substantially the same as, or substantially similar to, those of the polymer networks described with reference FIG. 1. The polymer droplets 441 may control movement of the first liquid crystal molecules 442 in the reflective region I. Additionally, the first liquid crystal layer 440 having the polymer droplets 441 may prevent or limit movement of the second liquid crystal molecules 447 in the transmissive region II. Furthermore, the liquid crystal display device may ensure enhanced reflection efficiency because of the first liquid crystal molecules 442 enclosed by the polymer droplets 441.

Figure 11A:
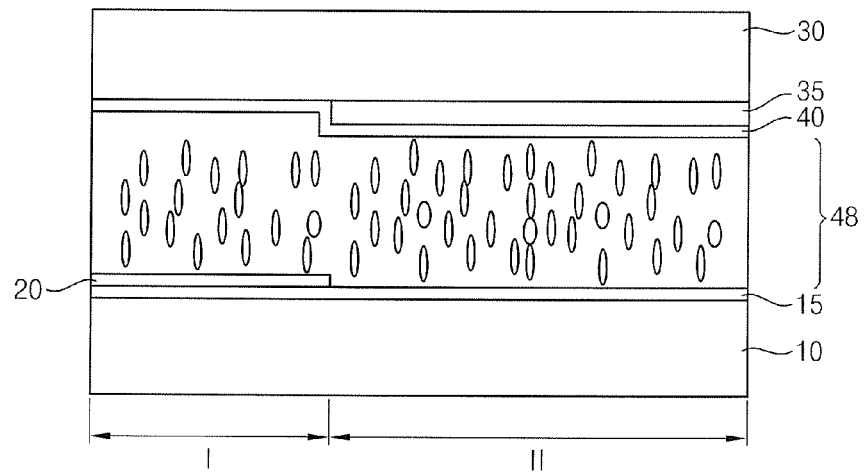
FIGS. 11A to 11C are cross sectional views illustrating a method of manufacturing a liquid crystal display device in accordance with example embodiments.
Figure 11B:
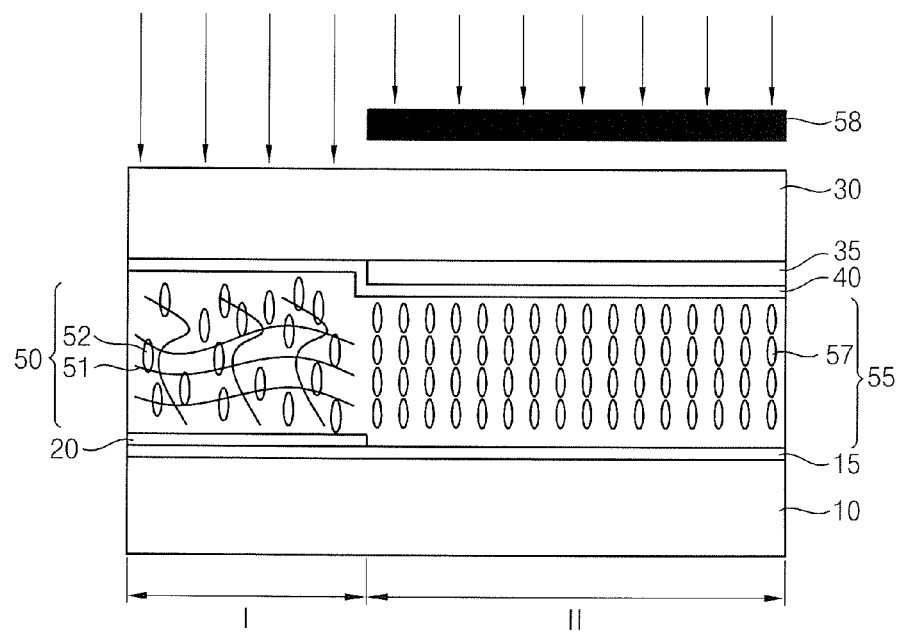
Figure 11C:
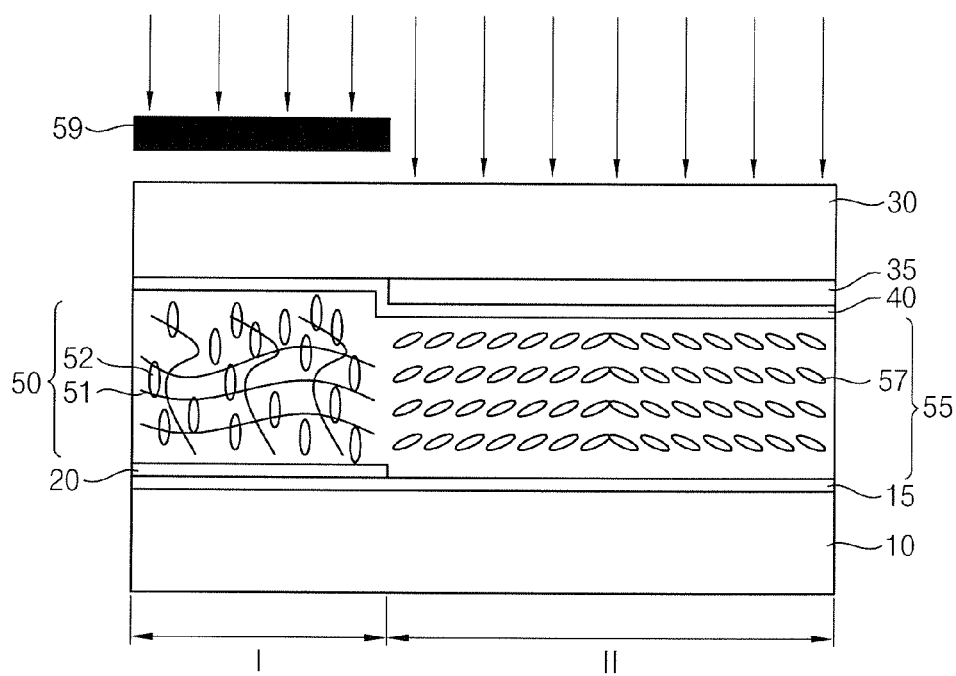

FIGS. 11A to 11C are cross sectional views illustrating a method of manufacturing a liquid crystal display device in accordance with example embodiments. The liquid crystal display device obtained by the method illustrated in FIGS. 11A to 11C may have a construction substantially the same as, or substantially similar to, that of the liquid crystal display device described with reference to FIG. 1. However, those of ordinary skill in the art would understand that the method according to example embodiments may be properly and easily modified to manufacture one of the liquid crystal display devices described with reference to FIG. 2 to FIG. 10.

Referring to FIG. 11A, a first electrode 15 may be formed on a first face of a first substrate 10 having a reflective region I and a transmissive region II. The first substrate 10 may include a transparent insulating material. For example, the first substrate 10 may include glass, transparent plastic, transparent metal oxide, etc.

The first electrode 15 may be formed using a transparent conductive material. For example, the first electrode 15 may include transparent alloy, transparent metal compound, carbon nano-tube (CNT), transparent alloy containing silicon, transparent metal compound containing silicon or fluorine, etc. The first electrode 15 may be formed on the first substrate 10 by a sputtering process, a printing process, a spray coating process, a pulsed laser deposition (PLD) process, an electron-beam evaporation process, a laser patterning process, etc. The first electrode 15 may be obtained by patterning a first conductive layer (not illustrated) after forming the first conductive layer on the first face of the first substrate 10.

In example embodiments, a switching structure (not illustrated) may be provided on the first substrate 10 before forming the first electrode 15. That is, the switching structure may be formed between the first substrate 10 and the first electrode 15. The switching structure may include a wiring, a switching element, an insulation layer, a contact, a pad, a conductive region, etc.

A reflection layer 20 may be formed on the first electrode 15 in the reflective region I. Namely, the reflection layer 20 may be formed on a portion of the first electrode 15 located in the reflective region I of the first substrate 10. The reflection layer 20 may be formed using a material having relatively high reflectivity. For example, the reflection layer 20 may include metal, alloy, and/or metal compound. The reflection layer 20 may be formed on the first electrode 20 by a sputtering process, a printing process, an evaporation process, a pulsed laser deposition process, a spray coating process, etc. The reflection layer 20 may be obtained by patterning a second conductive layer (not illustrated) after forming the second conductive layer on the first electrode 15.

A color filter 35 may be formed on a first face of a second substrate 30. The second substrate 30 may also have the reflective region I and the transmissive region II. The second substrate 30 may also include a transparent insulating material. For example, the second substrate 30 may include glass, transparent plastic, transparent metal oxide, etc.

The first face of the second substrate 30 may substantially correspond to the first face of the first substrate 10. In this case, the color filter 35 may be positioned in the transmissive region II of the second substrate 30. In example embodiments, a plurality of color filters 35 for selectively filtering red light, green light, and/or blue light may be formed on the first face of the second substrate 30. Here, the color filters 35 may be arranged in accordance with related pixels of the liquid crystal display device.

A second electrode 40 may be formed on the color filter 35 and the first face of the second substrate 30. Thus, the second electrode 40 may be formed in both of the reflective region I and the transmissive region II. The second electrode 40 may cover the color filter 35 in the transmissive region II and may directly make contact with the first face of the second substrate 30 in the reflective region I. The second electrode 40 may be formed using a transparent material. For example, the second electrode 40 may be formed using transparent alloy, transparent metal compound, carbon nano-tube, transparent alloy containing silicon, transparent metal compound containing silicon or fluorine, etc. Further, the second electrode 40 may be formed on the color filter 35 and the second substrate 10 by a sputtering process, a printing process, a spray coating process, a pulsed laser deposition process, an electron-beam evaporation process, a laser patterning process, etc.

In example embodiments, the second electrode 50 may be formed by patterning a third conductive layer (not illustrated) after forming the third conductive layer on the color filter 35 and the second substrate 30. Here, a portion of the second electrode 40 in the transmissive region II may have various structures. For example, the second electrode 40 in the transmissive region II may have a slit, a grill, a circular hole, an elliptical hole, a polygonal hole, a circular opening, an elliptical opening, a polygonal opening, a bended slit, a bended grill, etc.

In some example embodiments, an additional element may be provided between the first substrate 10 and the second substrate 30, and the first substrate 10 may be combined with the second substrate 30 while ensuring a gap (e.g., a predetermined gap) between the first and the second substrates 10 and 30. The additional element may include a column spacer, a member for ensuring a cell gap of the liquid crystal display device, a sealing member, etc.

Referring now to FIG. 11A, a preliminary liquid crystal structure 48 is formed between the first substrate 10 and the second substrate 30. The preliminary liquid crystal structure 48 may be formed by a printing process, a spray process, etc. The preliminary liquid crystal structure 48 may be injected into a space between the first and the second substrates 10 and 30. Alternatively, the preliminary liquid crystal structure 48 may be printed on at least one of the first substrate 10 and the second substrate 30. The preliminary liquid crystal structure 48 may be formed in the reflective and the transmissive regions I and II. In example embodiments, the preliminary liquid crystal structure 48 may include liquid crystal molecules, monomers, a photoinitiator, reactive mesogens, etc. The liquid crystal molecules may be mixed with the monomers, the photoinitiator and the reactive mesogens.

Referring to FIG. 11B, a first mask 58 may be located over the transmissive region II of the second substrate 30. The first mask 58 may cover the transmissive region II, whereas the first mask 58 may leave the reflective region I exposed. In some example embodiments, the first mask 58 may be positioned over the transmissive region II of the first substrate 10. Here, the reflective region I of the first substrate 10 may be exposed by the first mask 58.

Using the first mask 58, a first exposure process may be performed about a first portion of the preliminary liquid crystal structure 48 in the reflective region I as indicated by the arrows. The first exposure process may include an ultraviolet (UV) light exposure process.

In the first exposure process according to example embodiments, a light such as an UV light may be irradiated into the first portion of the preliminary liquid crystal structure 48 in the reflective region I. Thus, polymer seeds may be generated in the first portion of the preliminary liquid crystal structure 48 by the light. The monomers may be polymerized by the polymer seeds to form polymer networks 51 in the first portion of the preliminary liquid crystal structure 48. First liquid crystal molecules 52 in the reflective region I may be partially and/or entirely dispersed in the polymer networks 51. Further, the first liquid crystal molecules 52 may be separated from the polymer networks 51. That is, some of the first liquid crystal molecules 52 may be partially and/or totally captured by the polymer networks 51, and others of the first liquid crystal molecules 52 may be positioned between the polymer networks 51. In some example embodiments, the monomers in a second portion of the preliminary liquid crystal structure 48 in the transmissive region II may be partially polymerized to form the polymer networks 51 in the reflective region I. As a result, a first liquid crystal layer 50 having the polymer networks 51 and the first liquid crystal molecules 52 may be formed in the reflective region I while forming a second liquid crystal layer 55 having second liquid crystal molecules 57 in the transmissive region II. Here, the second liquid crystal molecules 57 may be initially oriented in a first direction (e.g., a predetermined direction). That is, the preliminary liquid crystal structure 48 may be changed into the first and the second liquid crystal layers 50 and 55 by the first exposure process.

Referring to FIG. 11C, a second mask 59 may be located over the reflective region I of the second substrate 30. The second mask 59 may cover the reflective region I of the second substrate 30, whereas the second mask 59 may leave exposed the transmissive region II of the second substrate 30. Alternatively, the second mask 59 may be located over the reflective region I of the first substrate 10. Here, the second mask 59 may expose the transmissive region II of the first substrate 10 while covering the reflective region I of the first substrate 10.

A second exposure process may be executed on the second liquid crystal layer 55 in the transmissive region II using the second mask 59 as denoted by the arrows. The second exposure process may include an UV light exposure process. In some example embodiments, an electric field (e.g., a predetermined electric field) may be generated between the first substrate 10 and the second substrate 30. The electric field may be generated by applying voltages to the first electrode 15 and/or the second electrode 40. In other words, the second exposure process may be carried out while generating the electric field between the first and the second substrates 10 and 30.

In the second exposure process according to example embodiments, when a light, such as an UV light, is irradiated into the second liquid crystal layer 55 in the transmissive region II while applying the electric field to the second liquid crystal layer 55, remaining monomers may be removed from the second liquid crystal layer 55, and the second liquid crystal molecules 57 in the second liquid crystal layer 55 may be arranged along a desired direction in accordance with an operation mode of the liquid crystal display device. Therefore, the liquid crystal structure having the first and the second liquid crystal layers 50 and 55 may have improved response speed or restoration speed, and also may effectively reduce or prevent bruising phenomena and pooling phenomena.

When a first polarization plate (not illustrated) may be formed on a second face of the first substrate 10 and/or a second polarization plate (not illustrated) may be formed on a second face of the second substrate 30, the liquid crystal display device may be manufactured.

According to example embodiments, a liquid crystal display device may include a liquid crystal structure having a first liquid crystal layer and a second liquid crystal layer. The first liquid crystal layer may include a polymer network or a polymer droplet. First liquid crystal molecules in the first liquid crystal layer may be dispersed in the polymer network or the polymer droplet. The first liquid crystal layer may be located in a reflective region of the liquid crystal display device. The second liquid crystal layer may include second liquid crystal molecules oriented in a first direction (e.g., a predetermined direction). The second liquid crystal layer may be formed in a transmissive region of the liquid crystal display device without dividing domains. The reflective region having the first liquid crystal layer may enclose the transmissive region having the second liquid crystal layer. Further, movement of the second liquid crystal layer may be controlled by the first liquid crystal layer or an isolation wall, and movement of the first liquid crystal layer may be confined by the polymer network or the polymer droplet. Therefore, the liquid crystal display device may effectively reduce or prevent some problems of the conventional liquid crystal display device such as pooling phenomena, bruising phenomena, etc. Additionally, the liquid crystal display may ensure enhanced reflectivity by the first liquid layer and a reflection layer without an additional process such as an embossing process. Furthermore, manufacturing processes and cost for the liquid crystal display device may be reduced because the liquid crystal structure may be obtained by a simplified process.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function, and not only structural equivalents, but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The invention is defined by the following claims, with equivalents of the claims to be included therein.

What is claimed is:

1. A liquid crystal display device comprising:
    a first substrate having a reflective region and a transmissive region;
    a second substrate corresponding to the first substrate;
    a liquid crystal structure between the first substrate and the second substrate, the liquid crystal structure comprising a first liquid crystal layer in the reflective region and a second liquid crystal layer in the transmissive region, wherein the first liquid crystal layer is configured to limit movement of the second liquid crystal layer;
    a first electrode on a first face of the first substrate;

a color filter on a first face of the second substrate;
a second electrode on the color filter; and
a light opening in the color filter and in the second electrode in the reflective region, wherein the light opening exposes the first liquid crystal layer to the second substrate.

2. The liquid crystal display device of claim 1, wherein the first liquid crystal layer comprises a polymer network and first liquid crystal molecules dispersed in the polymer network.

3. The liquid crystal display device of claim 2, wherein the second liquid crystal layer comprises second liquid crystal molecules oriented in a first direction.

4. The liquid crystal display device of claim 1, wherein the first liquid crystal layer comprises a polymer droplet and first liquid crystal molecules enclosed by the polymer droplet.

5. The liquid crystal display device of claim 1, further comprising an isolation wall located between the reflective region and the transmissive region.

6. The liquid crystal display device of claim 5, wherein the first liquid crystal layer comprises first liquid crystal molecules bordered by the isolation wall.

7. The liquid crystal display device of claim 1, further comprising a reflection layer located on the first electrode in the reflective region.

8. The liquid crystal display device of claim 1, further comprising:
a first polarization plate located on a second face of the first substrate; and
a second polarization plate located between the first face of the second substrate and the color filter in the transmissive region.

9. The liquid crystal display device of claim 1, further comprising:
a first polarization plate located on a second face of the first substrate; and
a second polarization plate located between the color filter and the second electrode in the transmissive region.

10. A method of manufacturing a liquid crystal display device, the method comprising:
forming a first electrode on a first face of a first substrate having a reflective region and a transmissive region;
forming a color filter on a first face of a second substrate;
forming a second electrode to contact the first face of the second substrate in the reflective region;
forming a light opening in the color filter and in the second electrode in the reflective region;
combining the first substrate with the second substrate; and
forming a liquid crystal structure between the first substrate and the second substrate, the liquid crystal structure comprising a first liquid crystal layer in the reflective region, and a second liquid crystal layer in the transmissive region, wherein the first liquid crystal layer is configured to control movement of the second liquid crystal layer,
wherein the light opening exposes the first liquid crystal layer.

11. The method of claim 10, further comprising forming a reflection layer on the first electrode in the reflective region.

12. The method of claim 10, wherein the forming the liquid crystal structure comprises:
forming a preliminary liquid crystal structure between the first substrate and the second substrate;
covering the transmissive region with a first mask; and
exposing the preliminary liquid crystal structure in the reflective region to a light by a first exposure process.

13. The method of claim 12, wherein the preliminary liquid crystal structure comprises monomers, photo initiator, and reactive mesogen mixed in liquid crystal molecules.

14. The method of claim 12, wherein the forming the liquid crystal structure comprises:
covering the reflective region with a second mask; and
exposing the second liquid crystal layer in the transmissive region to a light by a second exposure process while generating an electric field between the first substrate and the second substrate.

15. The method of claim 14, wherein each of the first exposure process and the second exposure process comprises an ultraviolet (UV) light exposure process.

* * * * *